No. 664,105. Patented Dec. 18, 1900.
C. P. STEINMETZ.
SYSTEM OF ELECTRICAL DISTRIBUTION.
(Application filed Feb. 20, 1900.)
(No Model.)
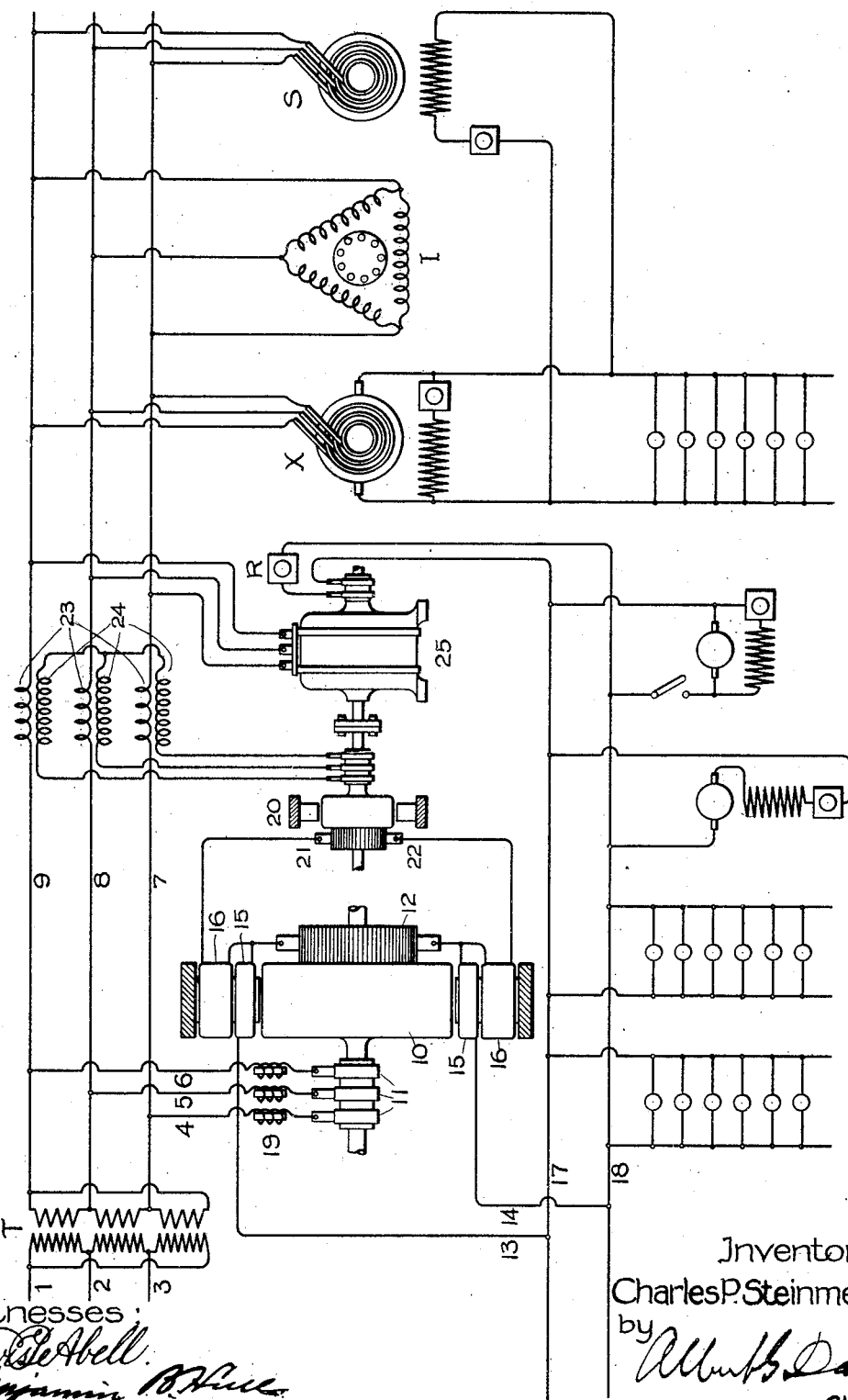
Witnesses:
Lewis E. Abell.
Benjamin B. Hull.
Inventor,
Charles P. Steinmetz
by Albert G. Davis
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

SYSTEM OF ELECTRICAL DISTRIBUTION.

SPECIFICATION forming part of Letters Patent No. 664,105, dated December 18, 1900.

Application filed February 20, 1900. Serial No. 5,880. (No model.)

*To all whom it may concern:*

Be it known that I, CHARLES P. STEINMETZ, a citizen of the United States, residing at Schenectady, in the county of Schenectady and State of New York, have invented certain new and useful Improvements in Systems of Electrical Distribution, (Case No. 1,602,) of which the following is a description.

The regulation of rotary converters is usually effected by providing them with field-windings in series with their direct-current mains. As the direct-current load varies, the field excitation of the converter is increased and causes either a decrease in the amount of lagging current flowing into the machine or an increase in the amount of leading current, as the case may be. This advancement in phase of the alternating current decreases the drop in voltage in the transmission-lines by which the rotary converter is supplied, and if these lines possess of themselves sufficient inductance or if sufficient inductance is artificially added the alternating electromotive force at the terminals of the converter may be maintained constant or caused to rise, as may be desired. Since the direct-current voltage bears a direct relation to the alternating impressed electromotive force, the voltage on the direct-current mains of the converter is therefore correspondingly regulated. Although the converter is provided with shunt and series field-windings in the same way as ordinary direct-current machines, the regulation of the converter, unlike that of direct-current machines, does not take place in the converter itself, but in the alternating transmission-lines leading to the converter. If in addition to feeding compound-wound rotary converters of the kind mentioned the transmission-lines feed also other translation devices or consumption-circuits, then the amount of current flowing in the transmission-lines is no longer directly dependent upon the load taken by the rotary converter or converters. The voltage consumed in the line consequently has no definite relation to the load on the converters, and the regulation of these converters is therefore seriously interfered with and becomes imperfect to an extent dependent upon the amount of current flowing in the transmission-lines due to translating devices other than the rotary converters. My invention aims to overcome this difficulty by varying the field of the rotary converter or converters in response to variation of the total load on the transmission-lines, thereby remedying the imperfect regulation which occurs in cases where the field excitation of the rotary converter is dependent only upon its impressed alternating voltage and its direct-current load. The specific means which I employ for effecting the requisite variation in field strength of the rotary converter or converters is a synchronously-driven dynamo-electric machine having alternating-current terminals and direct-current terminals, the direct-current terminals being connected in series with the shunt field-winding of the converter or converters, while the alternating-current terminals are connected to a branch leading to the other translating devices, the connection being such that a voltage bearing a direct relation to the load on such branch circuit is received at the said alternating-current terminals. The voltage at the direct-current terminals of the regulating-machine changes in accordance with the shifting in phase and variation in magnitude of the alternating current in the branch circuit, thereby varying the field excitation sufficiently to overcome the disturbing effects of current in the branch circuit upon the regulation of the system. My invention is not, however, in its broader aspects limited to such a specific arrangement of apparatus, but is, on the other hand, of much broader scope, as will readily be seen by reference to the claims appended hereto.

A more complete explanation of the invention in its details and its mode of operation is to be found in the following description and the accompanying drawing.

The conductors 1, 2, and 3, leading to the primary of the step-down transformer T, are supposed to represent the receiving end of a three-phase transmission-line. The current from the secondary of the step-down transformer is supposed to be consumed in a plurality of branch circuits, in one of which is placed either a single rotary converter or a number of rotary converters in parallel. In the drawings two branch circuits only are shown, one being indicated by the conductors 4 5 6, leading to a single rotary converter, the other by the conductors 7 8 9, leading to a miscellaneous collection of translating devices. The rotary converter fed from the lines 4, 5, and 6 is of the ordinary type having an armature 10, provided with collector-rings 11 and a commutator 12. The converter is compound wound in the ordinary manner, being provided with series windings 15 and shunt-windings 16. The series windings are traversed by the current which flows over the direct-current leads 13 and 14 of the machine to the direct-current mains or bus-bars 17 18. The shunt-windings 16 are connected across the direct-current terminals of the machine, and therefore receive a voltage directly dependent upon the voltage at the alternating-current terminals of the machine. The magnitude of the latter voltage is affected by varying the counter electromotive force of the converter, thereby varying the amount of wattless current flowing to the converter, and consequently varying the drop in the transmission-lines. If the converter-field is overexcited and the transmission-lines contain sufficient reactance, then as the load increases the voltage at the alternating-current terminals of the converter may be maintained constant or caused to rise with increase of load in a manner well understood. If the transmission-lines do not happen to contain sufficient reactance, it may be artificially supplied by means of inductance-coils. In the present instance these may be placed either in the mains 4 5 6, as indicated at 19, or in the secondary leads of the transformer T in such position that all of the secondary current must pass through the inductances before passing to either of the branch circuits 4 5 6 or 7 8 9. The amount of inductance required in the two cases will differ, but the principle of regulation is not affected thereby.

It will be noted that the system so far as described will regulate only for changes of load represented by consumption of energy in the direct-current circuit 13 14 of the converter. If the branch circuit 7 8 9 now begins to supply energy to translating devices, an additional drop of voltage will take place in the transmission-lines 1 2 3. No regulating action of the converter will take place in response to this increase in load on the system except such detrimental incidental effects as may be occasioned by the reduction in voltage at the terminals of the converter. Since the regulating effect of the converter is not called into action in response to variation of load on the transmission-lines, the system therefore is no longer self-regulating, and since the regulation of the converter really takes place by reactions in the transmission-lines and not in the machine itself rigorous automatic regulation of the converter itself therefore disappears. To overcome these difficulties, I provide suitable apparatus for producing a variation in excitation of the converter in response to variation of load on the transmission-lines other than that represented by the energy supplied to the converter itself. The apparatus which I make use of consists of a relatively small regulating dynamo-electric machine somewhat resembling a rotary converter. This machine is provided, like a rotary converter, with a single armature-winding, to which are connected a commutator and collector-rings. A suitable field-magnet structure is provided in coöperative relation to the armature and the excitation of the same can be secured, as desired, in a number of different ways—as for example, by means of a shunt-winding across the direct-current terminals of the machine, or the winding may be supplied with energy from a separate source. In some cases the field may be left entirely unwound, the excitation being obtained in this latter case by means of the reaction of currents flowing in the armature-circuit. The alternating-current terminals of this regulating-machine are connected with the secondary terminals of a transformer placed in series with the mains 7, 8, and 9, through which passes the balance of the energy of the transmission system not consumed by the rotary converter. I have indicated this regulating-machine at 20 and have shown it with its direct-current terminals 21 and 22 connected in series with the shunt field-winding 16 of the rotary converter. The voltage at the terminals 21 and 22 is therefore combined with that impressed upon the winding 16 from the direct-current terminals bearing upon the commutator 12 of the rotary converter, and the excitation of the field of the converter is effected accordingly.

The series transformer, to which the regulating-machine 20 is connected, consists of primary windings 23 in series with the mains 7, 8, and 9 and secondary windings 24 in inductive relation thereto. Since the mains 7, 8, and 9 represent a three-phase system, the secondaries 24 are connected to correspond, in the present instance a Y connection being used. It is to be understood, however, that a delta connection may likewise be employed, if desired.

The regulating-machine 20, although it resembles in structure a rotary converter, differs radically therefrom in its mode of operation, since it is positively maintained in synchronism with the alternating electromotive force of the mains and its armature prevented from shifting backward or forward in position with respect to its impressed electromotive force as the load on the machine varies. The consequence is that the polar line, due to current flowing in the regulating-machine, is shifted backward or forward with respect to the field structure in accordance with the shifting-in phase of the current in the secondary 24 of the series transformer. The result is that the voltage at the direct-current terminals of the regulating-machine varies in accordance with the value and phase relation of the current in the mains 7 8 9. The mode of action by which this regulating-machine is characterized is set forth more at length in the patent to E. W. Rice, No. 595,412, granted December 14, 1897, so that further explanation of the action is deemed unnecessary in the present instance.

A variety of means may be employed for maintaining the regulating-machine 20 in synchronism with the impressed alternating electromotive force of the mains. Thus, for example, the machine may be mounted on the shaft of the rotary converter to be regulated or mechanically connected thereto by suitable gearing, or the regulating-machine may be driven by a separate synchronous motor supplied from the mains 7 8 9, and this latter is the construction which I have shown in the drawing, the motor being indicated generally by the numeral 25. The synchronous motor 25 and the regulating-machine 20 are shown with their shafts rigidly coupled together; but it will be readily understood that any other suitable mechanical connection between the machines may be employed. The direct-current field of the synchronous motor 25 may be excited from any suitable source. In the present instance I have shown the direct-current terminals of the motor connected across the bus-bars or mains 17 and 18, supplied from the main rotary converter. A rheostat R may be used to regulate the strength of field of the synchronous motor, thereby adjusting the regulating effect of the machine driven thereby. By way of illustration I have shown the branch circuit (indicated by the mains 7, 8, and 9) as supplying a variety of translating devices, an induction-motor being shown at I, a synchronous motor at S, and a rotary converter at X. The rotary converter last mentioned is connected by its direct-current terminals to a suitable consumption-circuit and may, if desired, supply the current for exciting the field of the synchronous motor S.

Suppose now the load on the mains 17 and 18 were to increase. Then the current flowing through the series coils 15 of the converter supplying these mains would cause an increase in the field strength of the converter, which increase in field strength will correspondingly increase the counter electromotive force of the machine. If the current in the transmission-lines happened at that time to be lagging, this increase in counter electromotive force would decrease the amount of lagging current, and consequently the drop in the transmission-lines, thereby compensating for the increased drop due to increased load on the converter. If, on the other hand, the current in the transmission-lines were in phase with or in advance of the electromotive force, then leading current would flow, which by reacting upon the electromotive force, due to inductance of the transmission-lines, would cause an increase in electromotive force sufficient to compensate or more than compensate for the drop in the lines. The series coil 15 and the inductance 19 are so related as to produce a regulating effect sufficient to take care of variation in load of the converter itself.

The regulating-machine 20 is arranged to vary the magneto motive force due to the shunt-coils 16 in such a manner as to take care of the drop in voltage occasioned by load on the system other than that on the rotary converter. Supposing a load to be thrown on the branch 7 8 9, then an electromotive force would be impressed upon the alternating-current terminals of the regulating-machine 20. The regulating-machine would then produce an electromotive force of a value dependent upon the amount and phase relation of the current flowing, and this electromotive force, being combined in the proper direction with that in the shunt-field circuit of the converter, would cause a variation in field strength of the converter sufficient to compensate for the increased drop in the transmission system.

In the operation of the above-described system it will be observed that the rotary converter in one branch supplies or tends to supply the wattless current flowing in the other branch or branches of the system, so that there is a sort of mutual interchange of wattless currents between the respective branches of the system, whereby there is a tendency to maintain a given phase displacement of current in the transmission-lines.

It will of course be understood that my invention is not limited to the details in construction and operation as above set forth, since it is entitled to a much broader construction.

What I claim as new, and desire to secure by Letters Patent of the United States, is—

1. The combination of a source of alternating current, a plurality of consumption-circuits leading therefrom, a rotary converter fed from one of said circuits, and means for automatically varying the field excitation of said rotary converter in response to variations of load on more than one of said circuits.

2. The combination of a source of alternating current, transmission-lines leading therefrom, a rotary converter fed thereby, a load of varying power factor also fed thereby, and means for automatically varying the field excitation of said rotary converter in response to variation of power factor of said load.

3. The combination of a source of alternating current, a plurality of consumption-circuits leading therefrom, a rotary converter fed from one of said circuits, a translating device or devices fed from another of said circuits, and responsive means for overcoming the varying drop in voltage occasioned by current flowing both to said rotary converter and to said translating device or devices.

4. The combination of a source of alternating current, a plurality of consumption-circuits leading therefrom, a rotary converter supplied from one of said circuits, a synchronously-driven dynamo-electric machine having alternating-current terminals and direct-current terminals, connections between the direct-current terminals and a winding on said rotary converter, and operative connections between said alternating-current terminals and another of said circuits.

5. The combination of a source of alternating current, a plurality of consumption-circuits leading therefrom, a rotary converter supplied from one of said circuits, a synchronously-driven dynamo-electric machine having alternating-current terminals and direct-current terminals, connections between the direct-current terminals and a winding on said rotary converter, and connections between said alternating-current terminals and the secondary of a transformer the primary of which is in series with another of said circuits.

6. The combination of two branch circuits fed from the same source and arranged to supply energy to translating devices, a phase-controlling device in one of said branch circuits, and means responsive to current in the other branch circuit for varying the action of said phase-controlling device.

7. The combination of a plurality of branch circuits supplied with alternating currents, and means in one of said circuits for supplying wattless currents in response to a varying flow of wattless currents in all of said circuits.

8. The combination of a plurality of branch circuits supplied with alternating current, and a phase-controlling means in one of said circuits responsive to the flow of wattless currents in another circuit.

9. The combination of a plurality of circuits supplied with alternating current, and a rotary phase-controlling device in one of said circuits responsive to the flow of wattless currents in another of said circuits.

10. The combination of a source of alternating current, transmission-lines leading therefrom and connected to a plurality of consumption-circuits, and a rotary converter in one branch circuit arranged to supply wattless current in response to a varying consumption of wattless currents in another branch circuit.

11. The combination of a source of alternating current, transmission-lines leading therefrom and connected to a plurality of consumption-circuits, and a phase-controlling device in one of said circuits responsive to the flow of wattless current in another of said circuits.

In witness whereof I have hereunto set my hand this 19th day of February, 1900.

CHARLES P. STEINMETZ.

Witnesses:
BENJAMIN B. HULL,
MABEL E. JACOBSON.